May 13, 1941.  M. H. ENGLISH ET AL  2,242,117
METHOD OF MAKING BLASTING INITIATORS
Filed Dec. 24, 1937   2 Sheets-Sheet 1
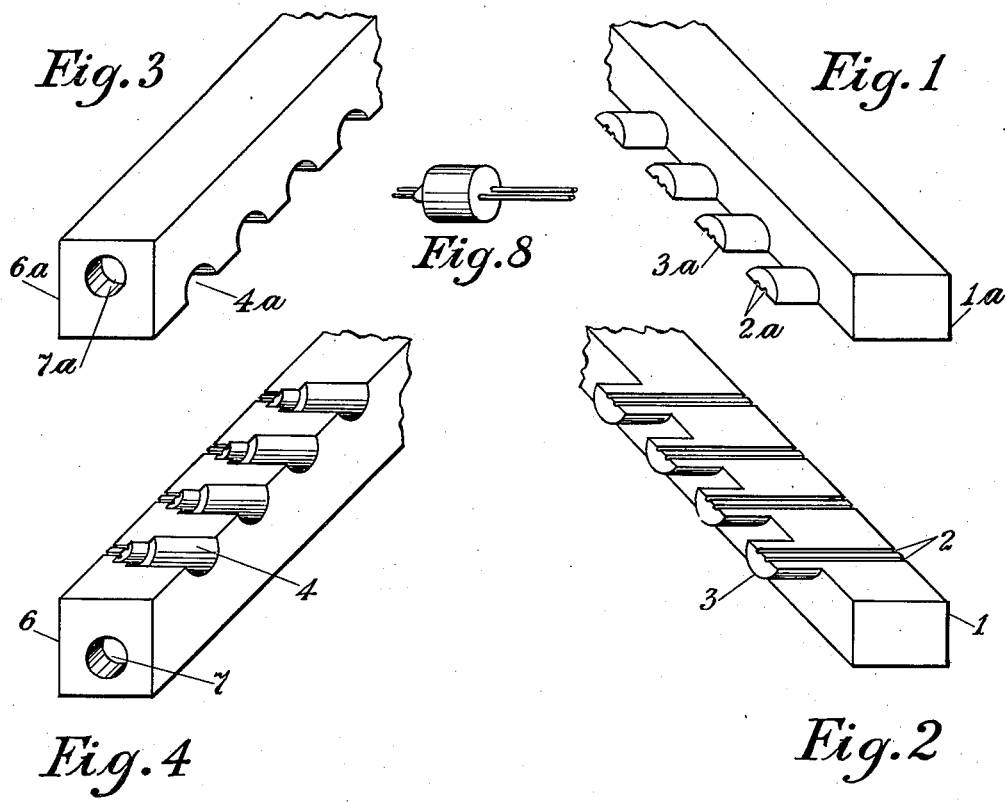
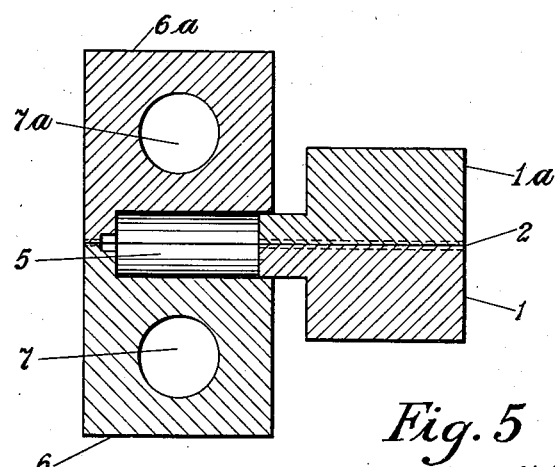
Myrle H. English
Roland R. Nydegger  INVENTORS
BY Thos. A. Wilson
ATTORNEY May 13, 1941.  M. H. ENGLISH ET AL  2,242,117
METHOD OF MAKING BLASTING INITIATORS
Filed Dec. 24, 1937  2 Sheets-Sheet 2
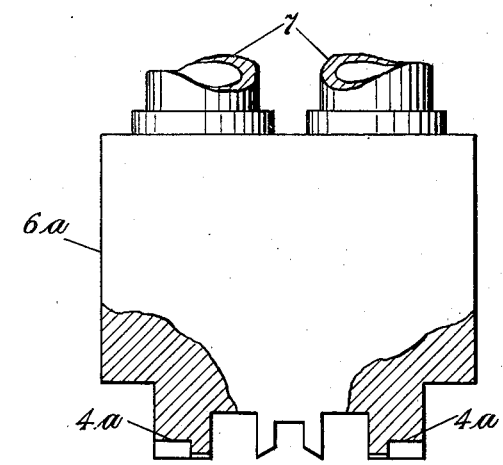
Fig. 6
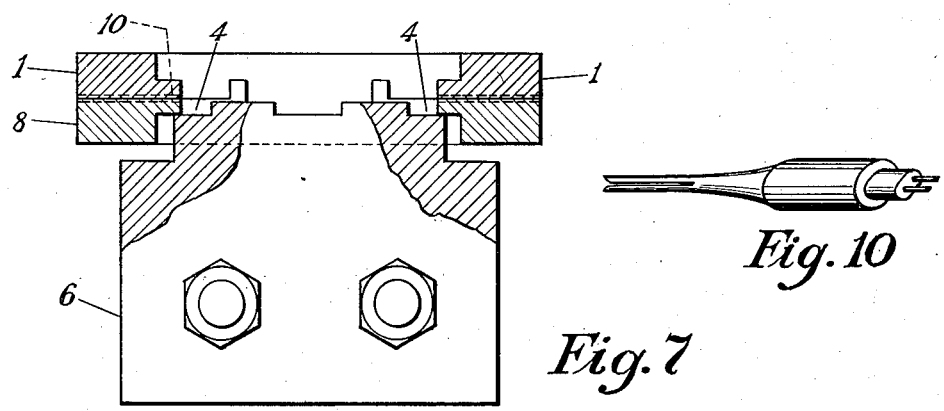
Fig. 7
Fig. 10
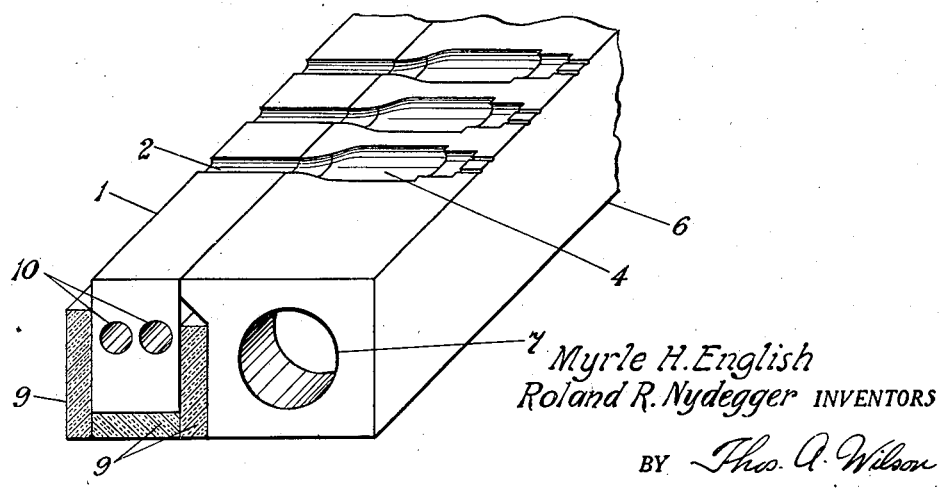
Fig. 9
Myrle H. English
Roland R. Nydegger INVENTORS
BY Thos. A. Wilson
ATTORNEY Patented May 13, 1941

2,242,117

UNITED STATES PATENT OFFICE 2,242,117

METHOD OF MAKING BLASTING INITIATORS

Myrle Hardt English, Pompton Lakes, N. J., and Roland Roswell Nydegger, Wilmington, Del., assignors to E. I. du Pont de Nemours & Company, Wilmington, Del., a corporation of Delaware Application December 24, 1937, Serial No. 181,647

4 Claims. (Cl. 18—59)

The present invention relates to the art of forming articles from thermoplastic compositions, rubber compositions and the like, and, in particular, to an improved process for the manufacture of electric blasting initiators involving the foregoing.

The introduction of thermoplastic compositions for use as insulation for electrical equipment and the like has rendered it desirable in many instances to vulcanize rubber compositions and the like in a position adjacent to or about a preformed body of a thermoplastic composition. The methods and apparatus known to the art have proved unsatisfactory for this purpose by reason of the inherent defect, common to such methods, that the temperatures necessarily employed to initiate vulcanization and curing of the rubber composition likewise cause softening of the thermoplastic composition and subsequent intermingling of these two types of compositions. The result is undesirable from the standpoint of effective vulcanization and curing, and the strength, durability, and appearance of the product.

The present invention has for its object a method and apparatus for the vulcanization of rubber compositions and the like adjacent to a body of thermoplastic material with the prevention of substantial intermingling of said rubber composition with said thermoplastic composition. A further object is the adaptation of this novel method and apparatus to the production of a novel and improved electric blasting initiator assembly. Additional objects will be apparent from the more detailed description of our invention which follows.

We have found that the foregoing objects are accomplished and the disadvantages overcome by the process of our invention which comprises vulcanizing a rubber composition in juxtaposition with a preformed body of thermoplastic material substantially in the absence of the intermingling of said rubber composition and said thermoplastic material by introducing said preformed body of thermoplastic material adjacent to said rubber composition, heating said rubber composition to vulcanizing temperature while conducting heat away from said body of thermoplastic material causing said body to remain in a solid state. The foregoing process is effectively practiced by introducing the rubber composition into a mold of predetermined shape, introducing said preformed body of thermoplastic material in a locus adjacent to said mold and in contact with said rubber composition therein, heating said rubber composition to a vulcanizing temperature in said mold while surrounding said body of thermoplastic material with a cooling device causing said body to remain in a solid state.

A useful and highly desirable adaptation of this process is the manufacture of a novel electric blasting initiator assembly comprising a rubber composition plug vulcanized about leg wires provided with thermoplastic insulation. This adaptation of the process of our invention is carried out by introducing leg wires provided with thermoplastic insulation by way of a leg wire seal into a plug chamber in a mold, said chamber being supplied with a rubber composition suitable for the manufacture of bridge plugs and the like.

The mold is equipped with heating means for maintaining a vulcanizing temperature in said plug chamber. These heating means preferably include a vent in said mold adapted to the passage of the heating fluid in heat exchange relationship with said plug chamber. The leg wire seal adapted to the reception and introduction of said insulated leg wires into said mold preferably comprises a heat conducting body grooved to receive said leg wires and with shape permitting its insertion into the open end of the plug chamber with substantially minimum surface engagement with said mold in order to limit heat transfer from said rubber composition and said heated mold to the thermoplastic insulation of the leg wires in said seal. The leg wire seal is provided with cooling means for the purpose of maintaining the leg wire insulation therein in a solid state regardless of the heat from said mold. In our preferred embodiment, this cooling of the seal is accomplished by mounting the same on a massive loading frame in heat conducting relationship with said seal to minimize temperature rise therein. With this arrangement, large quantities of heat may pass from mold to seal, but will immediately be conducted away from the grooves containing the thermoplastic insulation and disseminated throughout the massive loading frame.

In another embodiment, the seal is provided with cooling means including a vent in said seal adapted to the passage of cooling fluid in heat exchange relationship with the leg wire grooves therein. The seal itself need not fit into the mold. Heat insulating means are provided between the mold and seal, reducing heat transfer.

In order to describe our invention more clearly, we shall refer to the attached drawings which illustrate preferred embodiments thereof. This is done solely by way of illustration and is not to be regarded as a limitation upon the scope of our invention.

Referring generally to the figures of the drawings, Figs. 1 and 2 are views in perspective of the upper and lower sections of the grooved leg wire seal. Figs. 3 and 4 are views in perspective of the upper and lower sections of the mold. Fig. 5 is a sectional view of a single leg wire seal inserted in a single plug chamber of the mold. Figs. 6 and 7 are vertical end views of the upper and lower sections of the entire mold. In Fig. 7, the leg wire seal is depicted mounted on the massive loading frame and assembled with the lower section of the mold. Fig. 8 is a view of the finished rubber composition plug molded about the leg wires provided with thermoplastic insulation. Fig. 9 is a view in perspective of the lower section of a different embodiment showing seal and mold in combination. Fig. 10 is a view of the finished plug produced in this different embodiment of Fig. 9.

Similar characters are used wherever possible for the several views and in the following description to designate corresponding parts.

Referring in greater detail to the drawings, Figs. 1 and 2 show the upper and lower sections of the leg wire seal 1—a and 1, respectively, provided with grooves 2—a and 2, respectively, which co-operate to receive the leg wires and hold them in place. The projections 3—a and 3 of the seal are adapted to be inserted into the open end of the plug chamber 5 of mold 6 of Fig. 5 formed by the co-operation of depressions 4—a and 4 of Figs. 3 and 4, respectively. The upper and lower sections of the mold are provided with vents 7—a and 7, respectively, shown in Figs. 3, 4, and 5, which vents are adapted to the passage of steam or other heating fluid in heat exchange relationship with the plug chamber 5. An enlarged view of these vents 7—a and 7 is presented in Fig. 5. The leg wire seal 1 is preferably protected against the high temperatures of the mold by being mounted on the massive loading frame 8 of Fig. 7.

In carrying out the process of our invention in its preferred embodiment, the leg wires are stretched across this common frame 8, as shown in Fig. 7, and passed through the leg wire seals mounted in said frame so that a taut section of wire approximately 2⅞ inches long is supported between the right and left hand portions of the seals 1. Two strips of rubber compositions are then placed on the lower section of the mold 6, following which, seals 1 with their supporting frame-work 8 and leg wires are engaged in the mold cavities, after which, two more strips of rubber are placed on top of the leg wires. The surface engagement between mold 6 and seal 1 is kept at a minimum, as illustrated in Fig. 5, in order to limit the heat transfer to the thermoplastic insulation supported in grooves 2 of seal 1. Preferably, a linear contact of not over $\frac{1}{16}$ of an inch is maintained. The mold is then closed and heated by the circulation of steam through the vents 7—a and 7, compressing a rubber composition plug about each set of leg wires in contact with the thermoplastic insulation thereon but in the absence of any substantial intermingling of said rubber composition with said thermoplastic insulation. This result is possible because heat transferred from the hot mold to the wire seal 1 is immediately disseminated throughout the massive loading frame 8, which is subject to the cooling effect of surrounding air.

The further features of the complete mold as shown in Figs. 6 and 7 including the double molding system based on the two rows of plugs are disclosed and claimed in U. S. Patent 2,204,994. Accordingly, the further details of this system need not be discussed in the present application, the complete assembly being shown in Figs. 6 and 7 merely to point out the way in which the loading frame with wire seals mounted thereon may be assembled with a mold of this type.

The finished plug as shown in Fig. 8 demonstrates the neat joinder between thermoplastic insulation and rubber plug composition in the absence of the intermingling of the two as the result of formation by the process of our invention.

A somewhat different embodiment is set forth in Fig. 9, which shows a different arrangement of mold and leg wire seal in combination. The leg wire seal 1 rests adjacent to the mold 6 at the locus of each leg wire groove 2 leading into each mold chamber 4. However, throughout the greater portion of its surface, the leg wire seal 1 is protected from the heated mold 6 by the interposition of heat insulating material 9. The leg wire seal is provided with cooling means consisting of the vents 10 adapted to the passage of cooling fluid in heat exchange relationship with the leg wire grooves. The upper section of this type of mold is identical with the lower. In operating with this device, the leg wires are inserted through the grooves, chamber, and guides, rubber composition introduced into the chamber, and the mold closed. The mold is then heated by passing fluid through the vents 7 and simultaneously the seal is cooled by the passage of fluid through the vents 10. The resulting plug is shown in Fig. 10.

The process according to our invention has the advantage that rubber compositions may be vulcanized adjacent to preformed thermoplastic bodies in the absence of the intermingling of said two types of compositions, in particular, electric blasting initiators such as those prepared with the rubber plug, as disclosed and claimed in U. S. Patent 2,212,474, yet having the leg wires provided with thermoplastic insulation. By practicing the process according to our present invention, no substantial intermingling of rubber plug and thermoplastic insulation is effected, which would otherwise lower the strength and water-resistance of the resulting product.

In the foregoing we have described the preferred process and apparatus according to our invention. It will be apparent, however, that many variations may be made without departing from the scope of this invention. We intend, however, to be limited only by the following claims.

We claim:

1. A process for vulcanizing a rubber composition in juxtaposition with a preformed body of thermoplastic material in the absence of substantial intermingling of the rubber composition and the thermoplastic material, which process comprises introducing the rubber composition into a mold, positioning a preformed body of the plastic material at a locus substantially outside said mold and in contact with said rubber composition, heating said rubber composition to a vulcanizing temperature while maintaining the thermoplastic material below its melting point by placing in heat exchange relationship therewith a solid of high heat conductivity.

2. A process for vulcanizing a rubber composition in juxtaposition with a preformed body of thermoplastic material in the absence of substantial intermingling of the rubber composition and the thermoplastic material, which process comprises introducing the rubber composition into a mold, positioning a preformed body of the plastic material at a locus substantially outside said mold and in contact with said rubber composition, heating said rubber composition to a vulcanizing temperature while maintaining the thermoplastic material below its melting point by surrounding it with a solid of high heat conductivity cooled solely by the atmosphere.

3. In the manufacture of electric blasting initiators, the steps comprising placing a supply of rubber composition in a mold, introducing the ends of leg wires provided with thermoplastic insulation into intimate contact therewith, heating said rubber composition to vulcanizing temperature, and molding the same about said leg wires while maintaining the thermoplastic material outside said mold in solid condition by placing it in heat exchange relationship with a solid of high heat conductivity which is cooled solely by means of the atmosphere.

4. In the manufacture of electric blasting initiators, the steps comprising introducing the bare ends of leg wires provided with plastic insulation into intimate contact with a rubber composition situated in a mold, placing in heat exchange relationship with said thermoplastic material about the leg wires and outside the mold a solid body of high heat conductivity which is cooled solely by means of the atmosphere, heating said rubber composition to vulcanizing temperature, and molding the same about said leg wires within the mold, whereby a rubber composition plug is formed about the extremities of said leg wires substantially in the absence of the intermingling of said rubber composition with said thermoplastic insulation.

MYRLE H. ENGLISH.
ROLAND R. NYDEGGER.